July 28, 1964 W. J. SAUNDERS 3,142,102
AUTOMATIC RELEASE DEVICE FOR SEAT BELTS
Filed Jan. 3, 1962

INVENTOR.
WILLARD J. SAUNDERS
BY
Cushman, Darby & Cushman
ATTORNEYS

United States Patent Office 3,142,102
Patented July 28, 1964

3,142,102
AUTOMATIC RELEASE DEVICE FOR SEAT BELTS
Willard J. Saunders, Star Rte., De Ruyter, N.Y.
Filed Jan. 3, 1962, Ser. No. 164,045
8 Claims. (Cl. 24—230)

This invention relates generally to an automatic release device for seat belts and, more particularly, to an improved automatic release device which is operable within a predetermined time subsequent to impact.

While automatic or delayed release mechanisms for seat belts have been commercially available for some time, these have been usually of an expensive and complicated nature, in many instances requiring several operations by the wearer prior to release thereof. The present invention is an effort to simplify these prior art devices so that they may be made more readily available to more people at a greatly reduced cost. The present invention is well suited for use in automobiles as well as aircraft and might be readily adapted to existing seat belts.

By means of this invention, the seat belt will continue to hold the occupant of the vehicle in place upon his seat until a predetermined time after an impact has occurred. At this time, the mechanism of the present invention will be caused to be released thereby opening the belt and allowing the person to be easily and quickly removed from the vehicle. In this manner, the person is securely held in place during and immediately following on impact, but will be released when the impact has subsided and when it is desirable that he leave the vehicle.

Accordingly, it is an object of the present invention to provide a new and improved delayed release mechanism which will unlatch a seat belt a predetermined time after impact of a vehicle.

Another object of the invention is the provision of a simplified automatic release device comprising a latch which is normally held in closed position to fasten a seat belt to an anchor plate, but which is allowed to open at a predetermined time following impact as determined by a timing mechanism.

Other and further objects of this invention will become more apparent upon the more detailed description of the invention which follows when taken in conjunction with the following drawings in which like numerals refer to like elements throughout:

Figure 1:
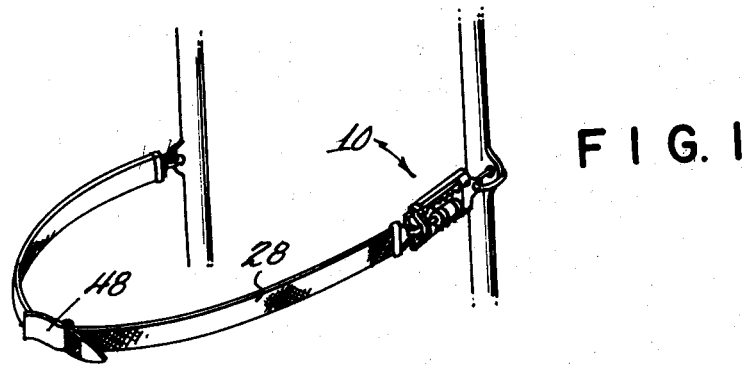
FIGURE 1 is a perspective view illustrating the present invention in combination with a conventional seat belt arrangement.

Referring now to the drawings, the automatic or delayed release mechanism of this invention is generally indicated at 10. The mechanism comprises an anchor plate 12 which is suitably fastened to the frame of the automobile or aircraft in which the seat belt is located. A pair of elongated slots 14 are formed in the anchor plate 12 and a base plate 16 is mounted upon the anchor plate 12. The base plate 16 is adapted to receive the bolts 18 which are secured thereto and which cooperate with the slots 14 of the anchor plate 12. Each of the bolts 18 extends a substantial distance above the top surface of the base plate 16 and a coil spring 19 is received by each of the bolts. A nut 21 is screwed onto the bolt a predetermined distance depending upon the amount of compression desired to be placed on the spring member.

A pair of mating protrusions or tang members 50 and 52 are suitably formed in the plates 16 and 18 respectively, the tangs 50 normally engaging the tangs 52. One end of the base plate 16 is slotted as at 20 to receive the latch 22. The latch 22 pivots upon an axis 24 and serves to engage the attachment or fastener member 26 attached to the seat belt 28 thereby connecting the latter to the base plate 16.

Figure 2:
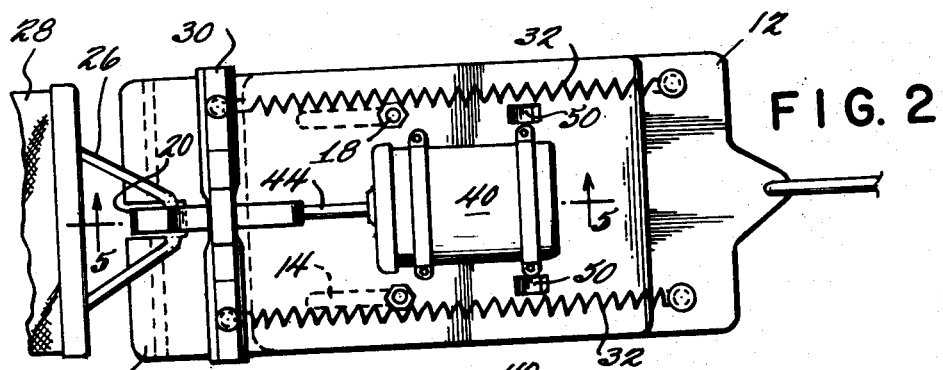
FIGURE 2 is a top plan view more clearly showing the automatic release mechanism of the present invention, while in its locked position.
Figure 3:
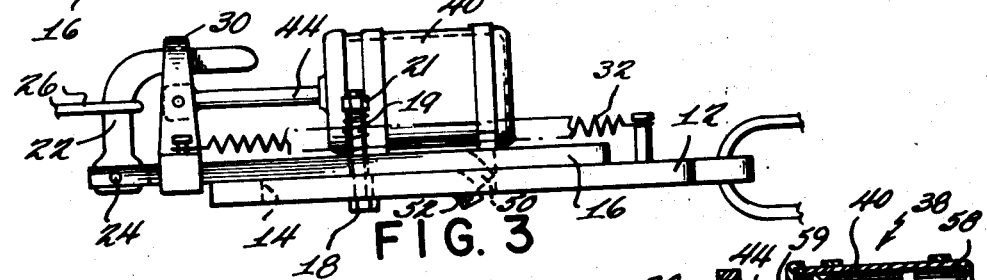
FIGURE 3 is a side elevation view of the device shown in FIGURE 2.
Figures 4, 5:
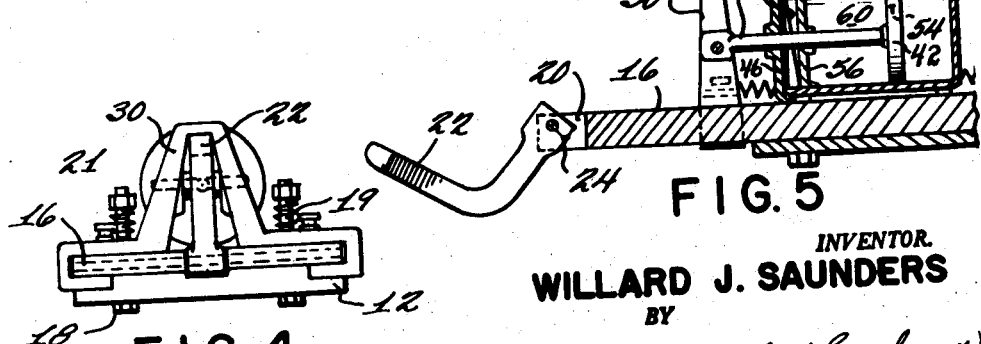
FIGURE 4 is an end elevation view of the device illustrated in FIGURES 2 and 3.
FIGURE 5 is a sectional view taken along line 5—5 of FIGURE 2 showing the release mechanism in its released position.

A holding bracket 30 is adapted to slide on the base plate 16 in a longitudinal direction, and as shown in FIGURES 2, 3, and 4 engages the latch member 22 holding same in a closed position. A pair of coil springs 32 are fastened at the ends thereof respectively to the base of the holding member 30 and to the anchor plate 12. These springs are shown in an extended position in FIGURES 2 and 3, and in a released position in FIGURE 5.

Also mounted upon the base plate 16 is a cylinder and piston unit generally indicated at 38. The structure 38 is similar to a dashpot and employs a cylinder 40, a piston 42 within the cylinder, and a piston rod 44 secured to the piston and adapted to slide within the sleeve 46 at the end of the cylinder. The opposite end of the rod 44 is suitably secured to the holding member 30. The cylinder 40 is fluid tight and is filled with any suitable fluid, as desired, depending upon the amount of time delay sought in the automatic release device, as will be described shortly. The diameter of the piston 42 may also be varied in order to produce any desried time delay.

A calibrated hole or orifice 54 is formed in the piston and passes therethrough. The size of the hole or orifice determines the speed with which the fluid in the cylinder will pass from one side of the piston to the other side when pressure is exerted on the piston rod 44, and is one method for setting the time lag in the device. In an effort to optimize operation of the cylinder and piston unit, a slidable seal 56 composed of rubber or other resilient material is preferably mounted on the piston rod for sliding movement and bearing against the side walls of the cylinder. This seal is to be held in place by a light coiled spring 59 located between it and the end wall of the cylinder. The purpose of the seal 56 is to assure that the portion of the cylinder adjacent the piston and piston rod will be completely filled with fluid at all times. More specifically, as the piston moves from left to right as viewed in FIGURE 5, and the piston rod 44 is thereby introduced into the cylinder 40, thus necessitating an increase in the volume of the fluid containing portion of the cylinder equivalent to the volume displaced by the piston rod 44. To this end, the seal 56 will be urged to the left and thus effect the necessary increase in the fluid containing volume of the cylinder 40. When the piston 42 is moved to the left, as viewed in FIGURE 5, the piston rod 44 will be withdrawn from the cylinder thus necessitating a corresponding increase in the volume of the fluid containing portion of the cylinder 40. Accordingly, it will be necessary for the seal to move toward the right a certain distance to accommodate that volume of the cylinder previously occupied by the piston rod. This assures that each of the chambers 58 and 60 will at all times be completely filled with fluid thereby optimizing the operating characteristics of the cylinder and piston unit 38.

The operation of the automatic release mechanism will now be described.

The delayed release mechanism 10 is preferably mounted to some rigid member of the aircraft or automobile on which it is to be used. One end of the device is connected to the seat belt 28 as seen in FIGURE 1 which has a conventional latch member indicated at 48 for use during normal operation. It is to be understood that the automatic release device which is disclosed herein is not to be opened and closed during normal operation but is designed to operate only during a period of emergency.

If the vehicle in which the seat belt is located encounters an impact, the body of the person being held in place thereby tends to move forwardly thereby tending to pull the seat belt 28 in a direction away from the anchor plate 12. Since the seat belt 28 is connected to the base plate 16 by means of the latch or holding member 30, the base plate 16 will also be urged to the left as viewed in FIGURES 2 and 3.

Cooperation between the bolts 18 and the slots 20 will cause the base plate 16 to slide to the left with respect to the anchor plate 12, the tangs 50 moving out of engagement with the tangs 52. The tangs 50 will thereby be caused to slide along the upper surface of plate 12, slightly pivoting the plate 16 in a counterclockwise direction as seen in FIGURE 3 whereby the springs 19 will be compressed. When the base plate 16 has moved along the surface of the anchor plate a predetermined distance, the tang members 50 will be urged into the slots 14 by the action of the springs 19 acting upon the surface of the plate 16. This will prevent a return of the base plate to its original position with respect to the anchor plate. Movement of the base plate to the left stretches the coil springs 32 thereby causing the bracket or holding member 30 to move out of engagement with the latch 22 whereby the latch pivots to an open position as indicated in FIGURE 5 releasing the seat belt 28 from the base plate 16.

When the base plate moves to the left and the coil springs 32 are stretched accordingly, the holding member 30 does not immediately move out of engagement with the latch member 22, but rather the movement of the holding member is somewhat delayed due to the action of the dashpot or timing mechanism 38. As has been mentioned previously, fluids of varying viscosity may be employed within the cylinder 40 and the diameter of the orifice 54 formed in the piston 42 may also be varied so as to produce the most desirable time delay period. The time delay might thus be set for any desirable period, say for example, 10 seconds after impact. In this manner, the seat belt 28 will serve its original purpose of firmly holding the person in position on his seat during and immediately following an impact, while providing an automatic release thereof after the impact has subsided so that the person can immediately leave the vehicle.

While the form of apparatus described herein constitutes a preferred embodiment of the invention it is to be understood that the invention is not limited to this precise form of apparatus but that various changes may be made therein without departing from the scope of the invention which is defined in the appended claims.

What is claimed is:

1. A delayed release mechanism for releasably securing a safety belt comprising: an anchor plate; at least one slot formed in said anchor plate; a base plate engaging said anchor plate; bolt means mounted on said base plate adapted to be received within said slot to allow sliding movement between said base plate and said anchor plate; normally closed latch means releasably securing said belt to said base plate; slide means mounted on said base plate holding said latch means in the normally closed position; resilient means connecting said slide means to said anchor means urging said slide means out of engagement with said latch means upon an impact and a timing mechanism fixed on said base plate and connected to said slide means counteracting movement of same.

2. The release mechanism set forth in claim 1 wherein said latch means is pivotally mounted on said base plate.

3. The release mechanism set forth in claim 1 further comprising a stop means mounted on said base plate adapted to engage said anchor means at a predetermined position to prevent sliding movement between said base plate and said anchor means beyond said predetermined position.

4. The release mechanism set forth in claim 1 wherein said timing mechanism comprises a dashpot and piston rod extending outwardly therefrom.

5. The release mechanism set forth in claim 1 wherein said resilient means comprises a coil spring fastened to said slide means and to said anchor means at the ends thereof.

6. A delayed release mechanism for releasably securing a vehicle safety belt comprising in combination an anchor means adapted to be fastened to a vehicle, a base member movably mounted upon said anchor means, said base member including stop means adapted to engage said anchor means at a predetermined position to prevent relative sliding movement between said base member and said anchor means beyond said predetermined position, latch means movably mounted on said base member, said latch means being movable from a normally closed to an open position, said latch means being adapted to releasably secure said safety belt when in said normally closed position and to release said safety belt when in said open position, slide means movably mounted on said base member, said slide means being adapted to normally operatively engage said latch means so as to retain said latch means in said normally closed position, said slide means being movable out of operative engagement with said latch means so as to permit said latch means to move to said open position, resilient means connecting said slide means to said anchor means, said resilient means being adapted to urge said slide means out of operative engagement with said latch means upon movement of said base member to said predetermined position when a minimum predetermined impact is applied to said safety belt, and a timing mechanism operatively connected to said slide means, said timing mechanism being adapted to resist movement of said slide means out of operative engagement with said latch means whereby said slide means is moved out of operative engagement with said latch means and said latch means is free to release said safety belt only after a predetermined time has elapsed from the time said impact is applied to said safety belt.

7. A delayed release mechanism as set forth in claim 6 wherein said timing mechanism is mounted on said base member and said timing mechanism includes a fluid containing cylinder, a piston slidable within said cylinder, an aperture in said piston and a piston rod extending through one end of said cylinder operatively connecting said piston to said slide means.

8. A delayed release mechanism as set forth in claim 7 wherein said cylinder contains a movable seal means located intermediate one end of said cylinder and said piston, said seal means being adapted to move within said cylinder so as to change the fluid containing volume thereof in response to the movement of said piston rod into and out of said cylinder whereby the portions of the cylinder adjacent the piston and piston rod will be filled with fluid at all times.

References Cited in the file of this patent

UNITED STATES PATENTS

| | | |
|---|---|---|
| 1,764,154 | Cramer | June 17, 1930 |
| 1,980,222 | Ogush | Nov. 13, 1934 |
| 2,336,967 | Sieverts | Dec. 14, 1943 |
| 2,557,313 | Quilter | June 19, 1951 |
| 2,680,476 | Saffeil | June 8, 1954 |
| 2,754,073 | Holm | July 10, 1956 |